April 2, 1974   J. KNAPPSTEIN ET AL   3,801,470
HEATING ARRANGEMENT FOR REGENERATIVE COKE OVEN BATTERIES
HEATED WITH RICH GAS OR LEAN GAS
Original Filed March 12, 1971   5 Sheets-Sheet 3

INVENTORS
JOHANNES KNAPPSTEIN
FRIEDRICH THIERSCH
BY WERNER SCHUCH

ATTORNEYS

INVENTORS
JOHANNES KNAPPSTEIN
FRIEDRICH THIERSCH
BY WERNER SCHUCH

ATTORNEYS

United States Patent Office 3,801,470
Patented Apr. 2, 1974

3,801,470
HEATING ARRANGEMENT FOR REGENERATIVE COKE OVEN BATTERIES HEATED WITH RICH GAS OR LEAN GAS
Johannes Knappstein, Friedrich Thiersch, and Werner Schuch, Recklinghausen, Germany, assignors to Firma Carl Still, Recklinghausen, Germany
Continuation of abandoned application Ser. No. 123,614, Mar. 12, 1971. This application Feb. 28, 1973, Ser. No. 336,813
Claims priority, application Germany, Mar. 19, 1970, P 20 13 024.9
Int. Cl. C10b 1/06, 5/12, 21/16
U.S. Cl. 202—142                                                     13 Claims

ABSTRACT OF THE DISCLOSURE

The coke oven batteries include heating flues in heating walls, with the flues having respective headers provided with ducts and lean gas or air transfer slots connecting the header ducts and the heating flues, and include regenerators sub-divided into compartments which, on one hand, communicate through floor ducts with lean gas, air or waste heat valves and, on the other hand, communicate with the header ducts. The respective outlet cross-sections of the transfer slots of respective header ducts, communicating with the same heating flue and connected to respective different regenerator compartments, differ, throughout the height of the heating flue, in respective defined orders, with there being at least two different such defined orders for each heating flue. Thus, the outlet cross-sections of the slots can increase linearly throughout the height of the flue or decrease linearly throughout the height of the flue. Alternatively, the change in the cross-sections can be non-linear, throughout the height of the flue.

This is a continuation of application Ser. No. 123,614 filed Mar. 12, 1971 and now abandoned.

BACKGROUND OF THE INVENTION

In heating arrangements for regenerative coke oven batteries heated with rich gas or lean gas, the cross-sections of the gas or air transfer slots have been dimensioned in a certain order in order to be able to adapt the heating of the coke ovens to the local heat requirements of the coking coal in the furnace chambers. Thus, the cross-sections of the transfer slots were made, for example, large at the bottom of the flue and small at the top, if a great deal of heat was required from the bottom with less heat being required from the top. Inversely, with increased heat requirements, the cross-sections of the transfer slots were made larger at the top than at the bottom. Whn he transfer slots were designed this way, they were fixed once and for all as to their dimensions, and were perfectly satisfactory for a certain type of coal that was being coked. When other types of coal were used, for which a different heat distribution in the heating wall would have been required, this could be attained by varying the amount of air.

However, this procedure is uneconomical when other than the optimum amounts of air must be used in order to be able to influence the heat distribution. The transfer slots were designed uniformly in all headers. It has also been suggested to vary the cross-sections of the gas or air slots in the headers by introducing inserts and, in this way, to adapt the amounts of poor or lean gas or of air passing through the slots to the local heat requirements. However, the arrangement of inserts at the ends of the header slots from the top during operation is a task that requires a great deal of time and cannot be carried out without a great deal of effort.

It has also been suggested to design the transfer slots, arranged at different levels, so that they extend steeply upwardly from the header ducts into the heating flues, and to stagger them laterally and to attach changeable nozzle tip headers on the ends of the passages. Such an arrangement is disclosed in German patent application P 19 03 903.0. In this arrangement, also, the exchange of the nozzle tip headers during operation of the coke oven battery, particularly with high coke oven batteries, is not easy. None of the above described heating arrangements permits adapting the air supply conditions from the outside, or from the colder part, by changing the heating from rich gas to poor or lean gas, or vice versa, to the type of gas, or to the type of coal, so that the flame form best suitable for heating the wall is obtained in the heating flue.

There is a known regenerative coke oven battery with high and low burning points in each heating flue, with regenerator compartments sub-divided by partitions for the combustion air, and lean gas or rich gas supplies at the bottom of the heating flue, and where the lowermost burning point is connected with every second compartment of a regenerator. In this arrangement, the regenerator compartments and the associated floor ducts have cross-sections adapted to the varying amount of lean gas or air which must be supplied in a known manner to the burning points which are arranged at different levels to attain a uniform heating effect over the entire height of the heating flue. Such a heating system can be adjusted from the exterior, or from the cold side, as far as the amount of heating medium is concerned. However, there are only two burning points in the heating flue, a top point and a bottom one, and not a plurality of lean gas or air transfer slots from the header ducts to the heating flues.

SUMMARY OF THE INVENTION

This invention relates to heating arrangements for regenerative coke oven batteries heated with rich or lean gas and, more particularly, to such a heating arrangement wherein it is possible to satisfy all theoretically optimal lean gas and air requirements throughout the height of the heating flue for all types of gas and for all types of coal.

In accordance with the invention, the air supply conditions or lean gas supply conditions of a heating arrangement with regenerative coke oven batteries, heated with rich or with lean gas, of the type including heating flues and heating walls with the flues having headers provided with ducts and lean gas or air transfer slots connecting the header ducts and the heating flues, and including regenerators sub-divided into compartments which, on the one hand, communicate through floor ducts with lean gas, air, or waste heat valves and, on the other hand, communicate with the header ducts, are adapted to the optimum operation when changing from rich gas to lean gas, or vice versa, or from one type of coal to be coked to another. For this purpose, the outlet cross-sections of the lean gas or air transfer slots of the header ducts of a heating flue connected to different respective regenerator compartments are dimensioned, over the height of the flue, in two or more defined but different orders.

The outlet cross-sections of gas or air slots of adjoining or opposed header ducts of a heating flue can increase or decrease linearly throughout the height of the flue. This design of the slot cross-sections permits adjustment of all the air distribution over the height of the heating flue from the outside, or cold part of the battery, namely from the air waste heat valve at the outer end of the floor duct, and in accordance with diagrams A and B, below. The extreme values of the air distribution are possible, among others, since the air supply for the slots of a header is completely closed within a heating flue in which the slots of two header ducts oppose each other, and the entire air is supplied through the slots of the other header.

DIAGRAM A

Height of equal width outlet openings in header ducts $b_1$ and $b_2$

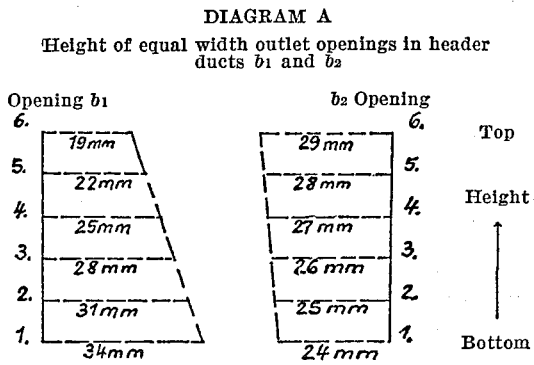

DIAGRAM B

Approximate distribution of heating medium quantities throughout flue height with different distribution through header ducts $b_1$ and $b_2$ according to Diagram A

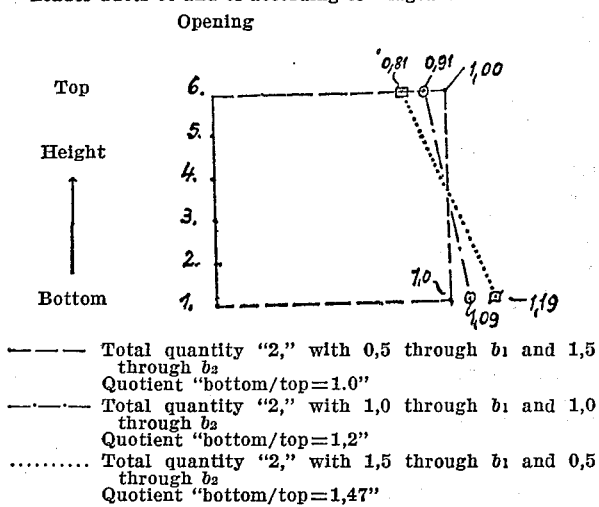

— — — Total quantity "2," with 0,5 through $b_1$ and 1,5 through $b_2$
Quotient "bottom/top=1.0"

—·—·— Total quantity "2," with 1,0 through $b_1$ and 1,0 through $b_2$
Quotient "bottom/top=1,2"

·········· Total quantity "2," with 1,5 through $b_1$ and 0,5 through $b_2$
Quotient "bottom/top=1,47"

In the same manner, the lean or poor gas supply to the heating flue can be completely shutoff for one of two header ducts in a flue and the entire lean gas can be supplied through the other header duct.

The outlet cross-sections of the lean or poor gas, or air, transfer slots of a header duct of a heating flue can also increase or decrease linearly over the height of the heating flue, while those of the adjoining or opposite header duct of the same heating flue remain constant over the height of the heating flue.

The outlet cross-sections of the lean gas or air transfer slots of a header duct of a heating flue can also initially increase over the height of the heating flue in a non-linear order and then decrease again, while those of the adjoining or opposite header duct of the same heating flue are arranged, throughout the height of the heating flue, in a linear order, that is, the outlet cross-sections are either constant throughout the height of the heating duct or increase or decrease in a uniform manner throughout the height of the heating flue.

Finally, the outlet cross-sections of the lean gas or air transfer slots of a header duct of a heating flue can initially increase through the height of the heating flue in a non-linear order and then decrease again, while the outlet cross-sections of the adjoining or opposite header duct of the same heating flue initially decrease throughout the height of the heating flue in a non-linear order and then increase again. This case is represented in Diagrams C and D, below.

DIAGRAM C

Height of equal width outlet openings in header ducts $b_3$ and $b_4$

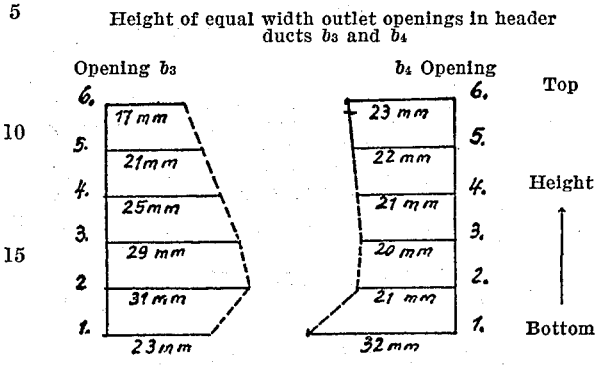

DIAGRAM D

Approximate distribution of heating medium quantities throughout flue height with different distribution through header ducts $b_3$ and $b_4$ according to Diagram C

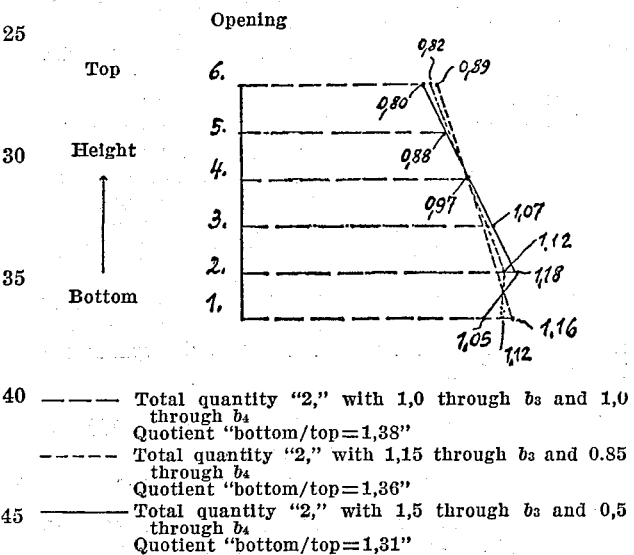

— — — Total quantity "2," with 1,0 through $b_3$ and 1,0 through $b_4$
Quotient "bottom/top=1,38"

—·—·— Total quantity "2," with 1,15 through $b_3$ and 0.85 through $b_4$
Quotient "bottom/top=1,36"

———— Total quantity "2," with 1,5 through $b_3$ and 0,5 through $b_4$
Quotient "bottom/top=1,31"

With the dimensioning of the lean gas or air transfer slots in accordance with the invention, it is possible to satisfy all theoretically optimal lean gas and air requirements throughout the height of the heating flue for all types of gas and for all types of coal.

An object of the invention is to provide an improved heating arrangement for regenerative coke over batteries heated with rich gas or lean gas.

Another object of the invention is to provide such a heating arrangement in which the outlet cross-sections of transfer slots of respective header ducts, communicating with a heating flue connected to respective different regenerator compartments, differ, throughout the height of the heating flue, in respective defined orders, with there being at least two different such defined orders for each heating flue.

A further object of the invention is to provide such a heating arrangement in which it is possible to satisfy all theoretically optimal lean gas and air requirements throughout the height of the heating flue for all types of gas and for all types of coal.

Another object of the invention is to provide such a heating arrangement which is free of the disadvantages of prior art heating arrangement.

For an understanding of the principles of the invention, reference is made to the following description of typical embodiments thereof as illustrated in the accompanying drawing.

Figure 1:
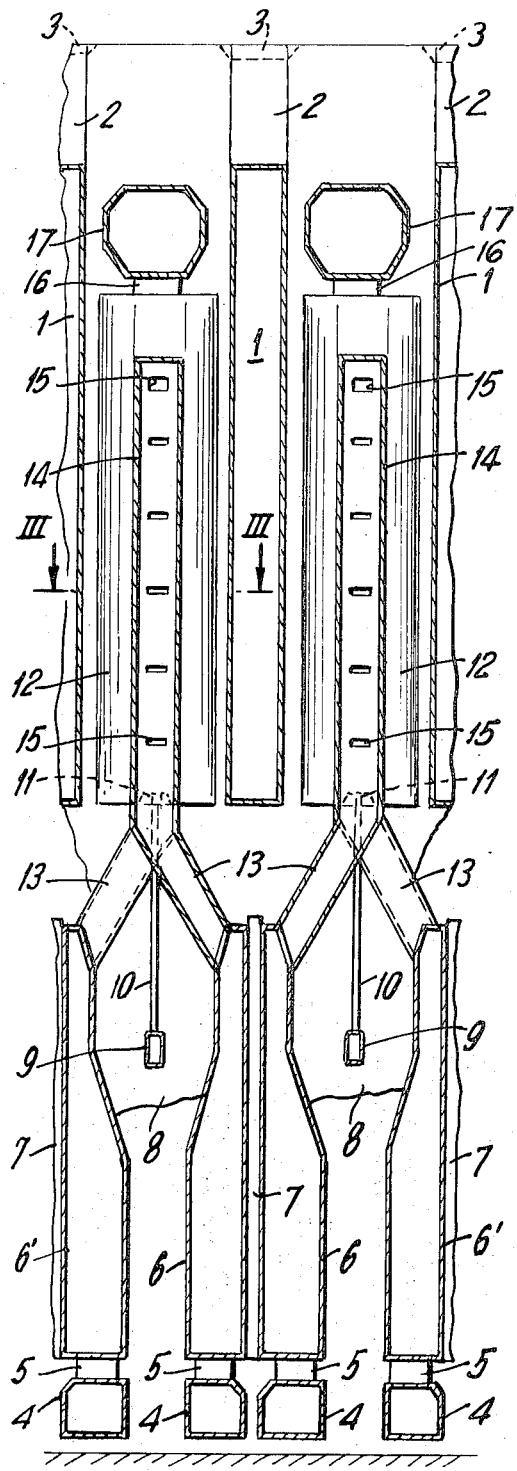
FIG. 1 is a partial vertical section through a half-divided coke battery heated with rich gas, and taken along the line I—I of FIG. 3.
Figure 4:
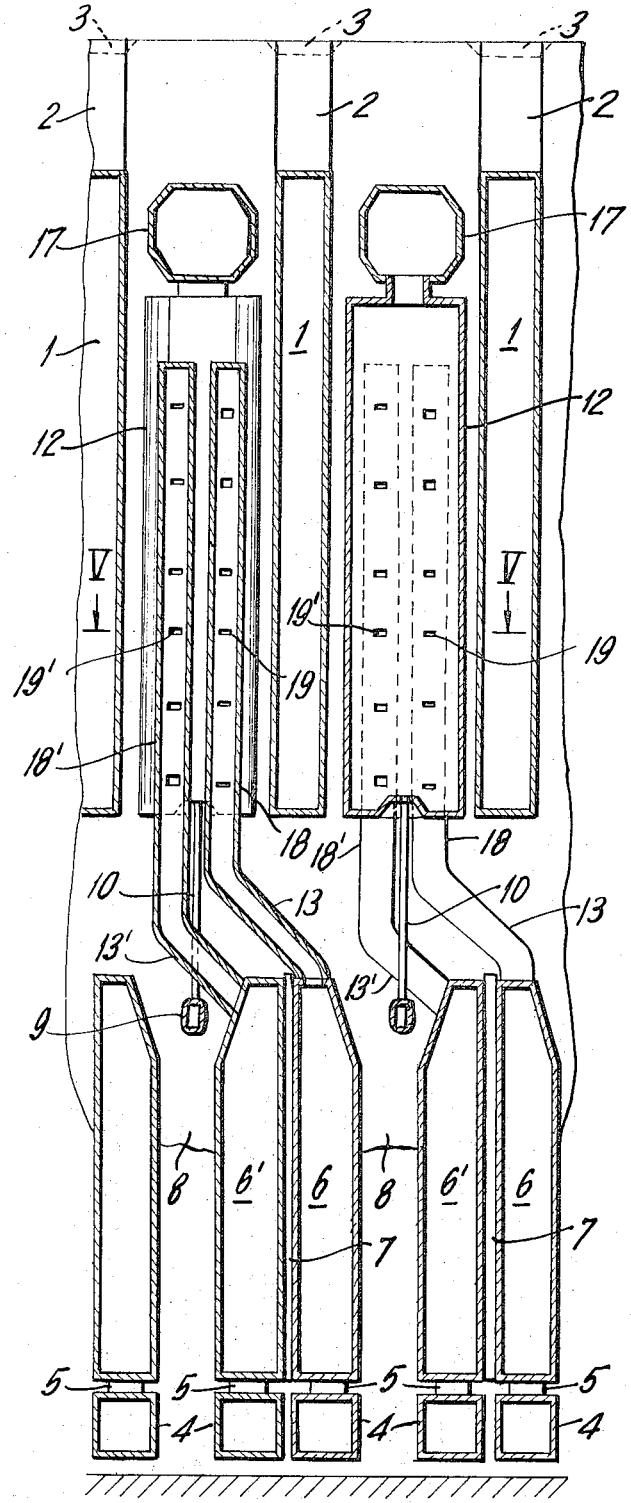
Figure 6:
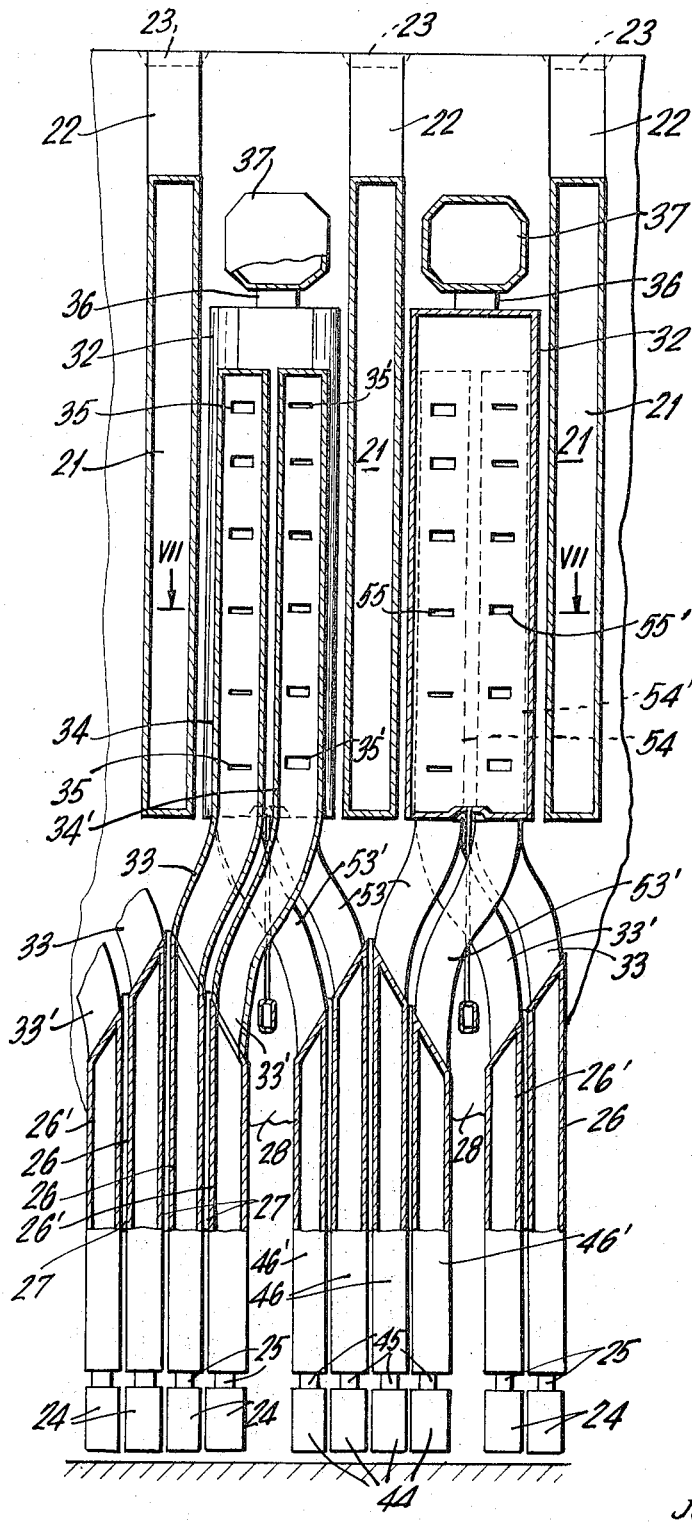
Figure 8:
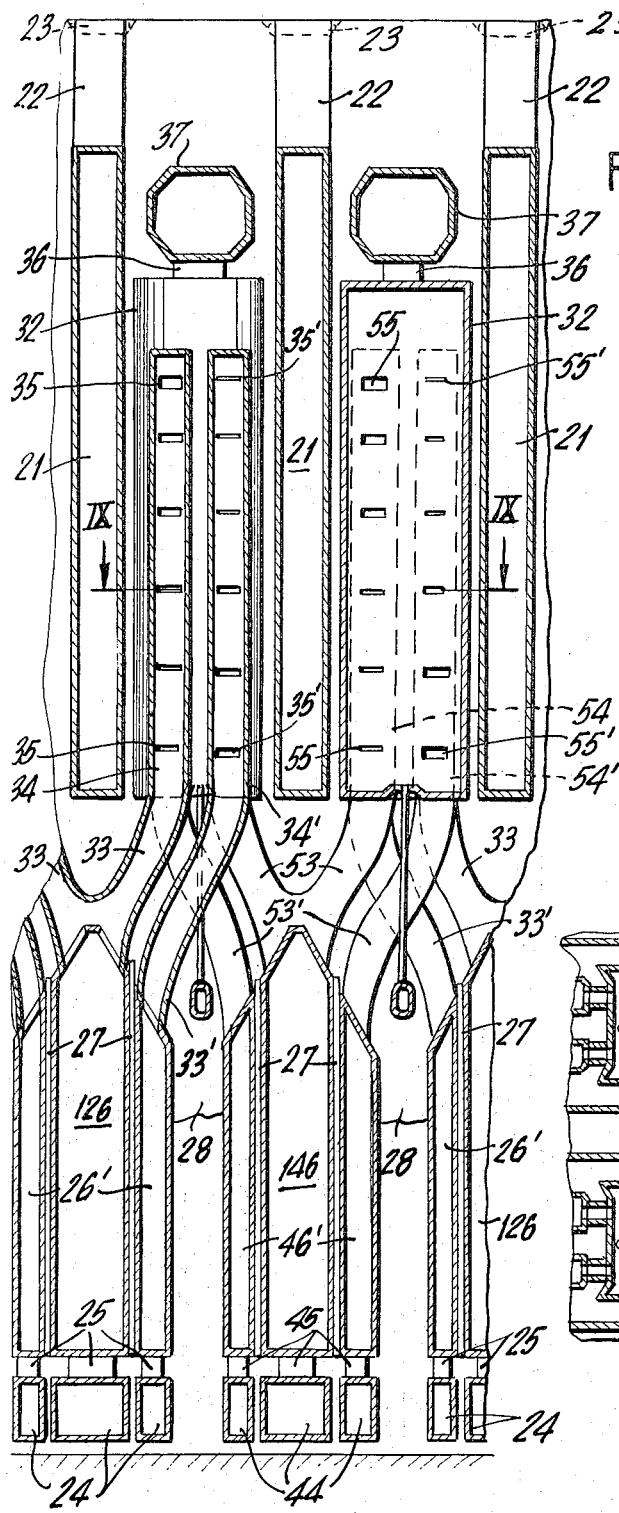
Figure 9:
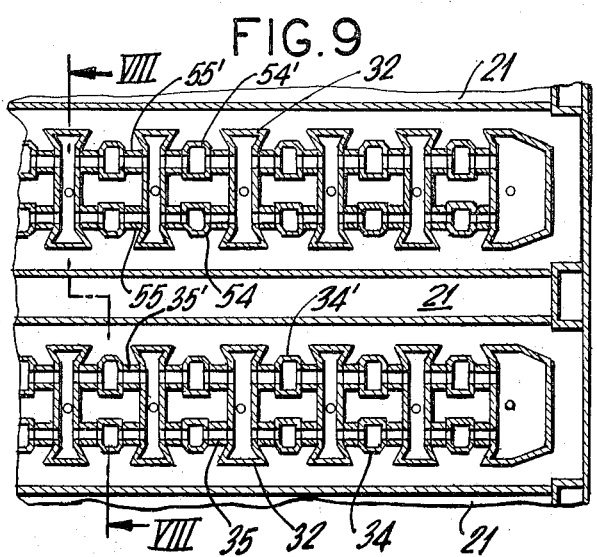

FG. 3 is a horizontal sectional view taken along the line III—III of FG. 1;

FIG. 4 is a view similar to FIG. 1 illustrating a different coke oven battery, and taken along the line IV—IV of FIG. 5;

FIG. 5 is a horizontal section taken along the line V—V of FIG. 4;

FIG. 6 is a vertical sectional view similar to FIG. 1 through another coke oven battery, taken along the line VI—VI of FIG. 7;

FIG. 7 is a horizontal section taken aong the line VII—VII of FIG. 6;

FIG. 8 is a view, similar to FIG. 1, through a further coke oven battery, taken along the line VIII—VIII of FIG. 9; and FIG. 9 is a horizontal sectional view taken along the line IX—IX of FIG. 8.

DESCRIPTION OF THE PREFERRED EMBODIMENTS

Figure 2:
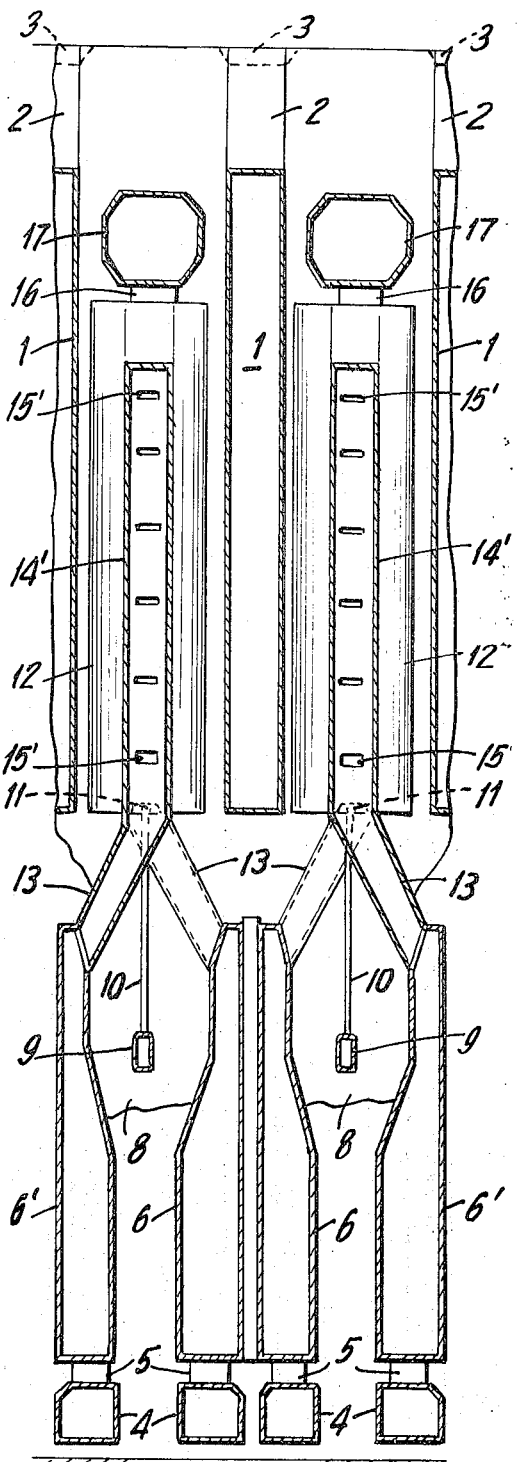
FIG. 2 is a view similar to FIG. 1, taken along the line II—II of FIG. 3.
Figure 3:
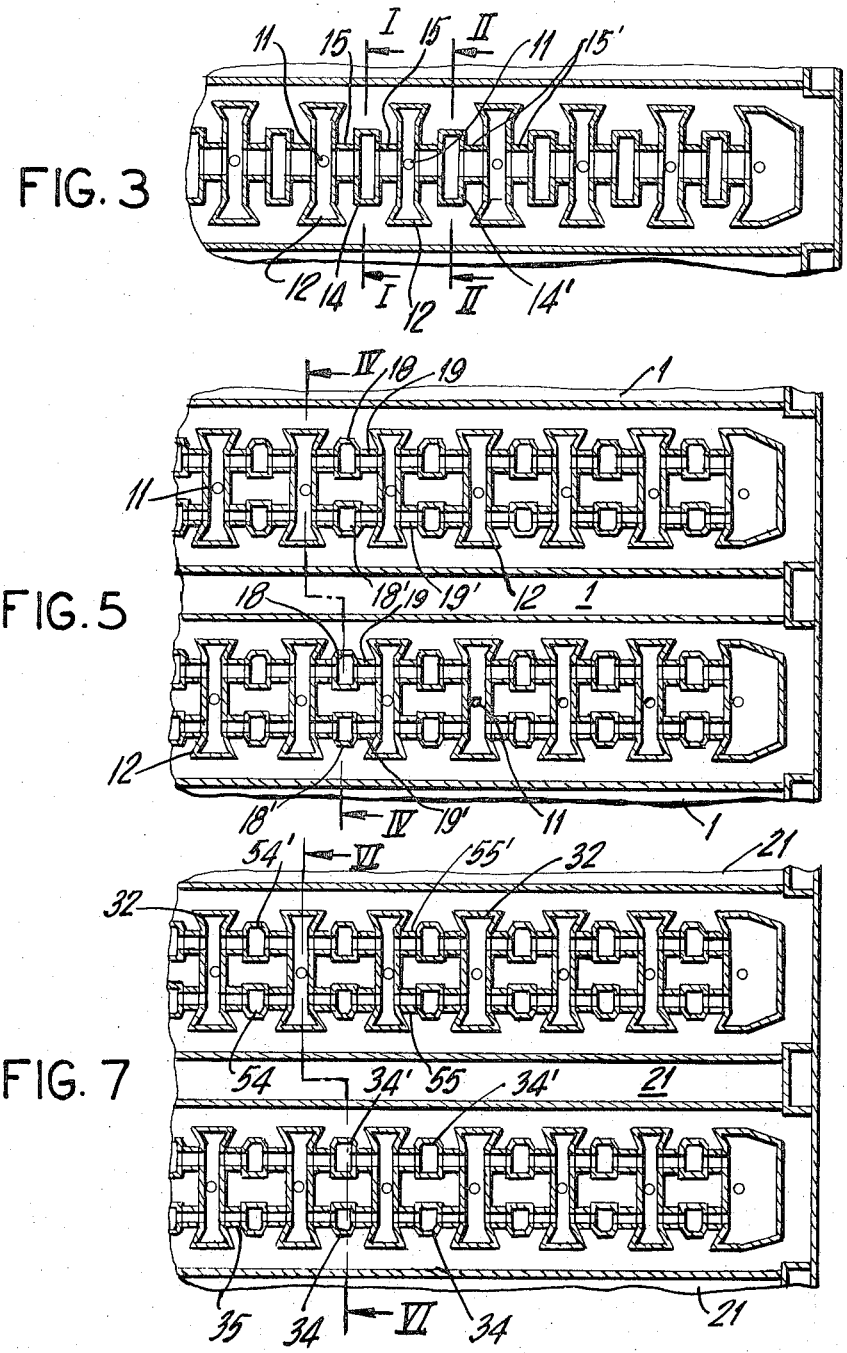

In the embodiment of the invention shown in FIGS. 1, 2 and 3, the illustrated regenerative coke oven batteries include oven chambers 1 with which are associated hoppers 2 having hopper covers 3. Regenerator floor ducts 4 are connected by passages 5 regenerator chamber 6 and 6', and regenerator partitions 7 separate the gas currents for adjoining heating walls from each other. Supporting walls 8 are provided between regenerator chambers 6, and rich gas ducts 9 are connected by feed lines 10 to rich gas nozzles 11 which are arranged at the bottoms of heating flues 12.

Transfer ducts 13, for combustion air, lead from regenerator chambers 6 to those header ducts 14 whose outlet slots 15 into a heating flue 12 have a small cross-section at the bottom and a large cross-section at the top. Transfer ducts 13' lead from regenerator chambers 6' to those header ducts 14' whose outlet slots 15' into heating flues 12 have a large cross-section at the bottom and a small cross-section at the top. Passages 16 connect heating flues 12 to upper horizontal ducts 17 serving to transfer the combustion gases to the outlet side of the coke oven battery.

From the foregoing, it will be clear that, with respect to each heating duct 12, that there are two series of transfer slots connecting header ducts to the heating flue, and that with respect to one series of transfer slots, the cross-sectional areas of the respective slots increase from the bottom to the top of the heating flue and the respective cross-sectional areas of the other slots decrease in area from the bottom to the top of the heating flue. FIGS. 1, 2 and 3 thus illustrate one variation in the respective cross-sections of the transfer slots from the bottom to the top of the heating flue.

Referring to FIGS. 4 and 5, header ducts 18 and 18' are arranged side-by-side in the headers. The connection between the header ducts and the heating flues 12 is established by the poor or lean gas, or air, transfer slots 19 and 19'. Obliquely opposed slots 19 and 19' are of equal width, but are dimensioned in different respective orders with respect to their heights and their cross-sections throughout the height of the heating flue.

In the embodiment of the invention shown in FIGS. 6 and 7, the oven chambers are indicated at 21, the hoppers at 22, the hopper covers at 23, the floor ducts for the air supply at 24, and the air passages into regenerator chambers 26 and 26' at 25. Regenerator compartments 26 and 26' are separated by partitions 27, and supporting walls 28 are arranged between adjacent regenerators. The heating flues are indicated at 32, and connections 33 and 33' extend from the regenerators to header ducts 34 and 34'. 35 and 35' indicate obliquely opposed air passages or transfer slots of equal widths but having their respective heights and cross-sectional areas dimensioned in different orders vertically of the heating flues. Passages 36 connect the upper ends of the heating flues into upper horizontal ducts 37. The regenerator floor ducts, for poor or lean gas, are indicated at 44 as connected by passages 45 to the regenerator compartments 46 and 46'. Transfer ducts 53 and 53' connect regenerator compartments 46 and 46', respectively, to respective header ducts 54 and 54' having poor or lean gas transfer slots 55 and 55'. Slots 55 and 55' have equal respective widths, but their respective heights and thus their respective cross-sectional areas vary in a certain order vertically of the heating flues.

The embodiment of the invention illustrated in FIGS. 8 and 9 differs from that illustrated in FIGS. 6 and 7 only in that adjoining regenerating chambers 26 are combined into a common regenerator chamber 126, and the adjoining regenerator chambers 46 are combined to a common regenerator chamber 146.

While specific embodiments of the invention have been shown and described in detail to illustrate the application of the principles of the invention, it will be understood that the invention may be embodied otherwise without departing from such principles.

What is claimed is:

1. In a heating arrangement for regenerative coke oven batteries heated with rich gas or lean gas, of the type including heating flues in heating walls with the flues having headers provided with ducts and lean gas or air transfer slots connecting the header ducts and the heating flues, and including regenerators sub-divided into compartments which, on the one hand, communicate through floor ducts with lean gas, air, or waste heat sources and, on the other hand, communicate with the header ducts; the improvement comprising the respective outlet cross-sections dimensions of the transfer slots of respective header ducts, communicating with a common heating flue and connected to respective different regenerator compartments differing throughout substantially the entire length of the header ducts in respective defined orders, with there being at least two different such defined orders for each heating flue.

2. In a heating arrangement for regenerative coke oven batteries, the improvement claimed in claim 1, in which the respective outlet cross-sections of the transfer slots vary linearly throughout substantially the entire length of the heating flue.

3. In a heating arrangement for regenerative coke oven batteries, the improvement claimed in claim 2, in which the header ducts are associated in pairs, the respective outlet cross-sections of the transfer slots of one header duct of each pair increasing throughout substantially the entire length of the heating flue and the respective outlet cross-sections of the transfer slots of the other header duct of a pair decreasing throughout substantially the entire length of the heating flue.

4. In a heating arrangement for regenerative coke oven batteries, the improvement claimed in claim 3, in which the associated header ducts of each pair are arranged in opposition.

5. In a heating arrangement for regenerative coke oven batteries, the improvement claimed in claim 3, in which the associated header ducts of each pair are arranged in adjoining relation.

6. In a heating arrangement for regenerative coke oven batteries, the improvement claimed in claim 1, in which the header ducts are arranged in pairs of associated header ducts; the respective outlet cross-sections of the transfer slots of a first header duct of each pair varying linearly throughout substantially the entire length of the heating flue, and the respective outlet cross-sections of the transfer slots of the second header of each pair remaining constant throughout substantially the entire length of the heating flue.

7. In a heating arrangement for regenerative coke oven batteries, the improvement claimed in claim 6, in which the respective outlet cross-sections of the transfer slots of said first header duct of each pair increase linearly throughout substantially the entire length of the heating flue.

8. In a heating arrangement for regenerative coke oven batteries, the improvement claimed in claim 6, in which the respective outlet cross-sections of the transfer slots of said first header duct of each pair decrease linearly throughout substantially the entire length of the heating flue.

9. In a heating arrangement for regenerative coke oven batteries, the improvement claimed in claim 1, in which the header ducts are arranged in pairs each including a first and second associated header duct; the respective outlet cross-sections of the transfer slots of the first header duct of each pair initially increasing non-linearly upwardly of the heating flue and then decreasing; the respective outlet cross-sections of the transfer slots of the second header duct of each pair being dimensioned in a linear order.

10. In a heating arrangement for regenerative coke oven batteries, the improvement claimed in claim 7, in which the respective outlet cross-sections of the transfer slots of the second header duct of each pair are constant throughout substantially the entire length of the heating flue.

11. In a heating arrangement for regenerative coke oven batteries, the improvement claimed in claim 7, in which the respective outlet cross-sections of the transfer slots of the second header duct of each pair increase linearly upwardly of the heating flue.

12. In a heating arrangement for regenerative coke oven batteries, the improvement claimed in claim 7, in which the respective outlet cross-sections of the transfer slots of the second header duct of each pair decrease linearly upwardly of the heating flue.

13. In a heating arrangement for regenerative coke oven batteries, the improvement claimed in claim 1, in which the header ducts are arranged in pairs each including a first and second associated header duct; the respective outlet cross-sections of the transfer slots of the first header duct of each pair initially increasing non-linearly upwardly of the heating flue and then decreasing; the respective outlet cross-sections of the transfer slots of the second header duct of each pair initially decreasing non-linearly upwardly of the heating flue and then increasing.

References Cited

UNITED STATES PATENTS

| 3,054,728 | 9/1962 | Schmidt | 202—151 X |
| 3,170,851 | 2/1965 | Van Ackeren | 202—139 X |
| 1,967,975 | 7/1934 | Schaefer | 202—143 X |
| 1,891,700 | 12/1932 | Wessel | 202—151 X |

NORMAN YUDKOFF, Primary Examiner

D. EDWARDS, Assistant Examiner

U.S. Cl. X.R.

202—151